US010102385B2

(12) United States Patent  (10) Patent No.: US 10,102,385 B2
Otero  (45) Date of Patent: Oct. 16, 2018

(54) STEGANOGRAPHIC IMAGE ON PORTABLE DEVICE

(71) Applicant: VISA INTERNATIONAL SERVICE ASSOCIATION, San Francisco, CA (US)

(72) Inventor: Cesar Otero, East Palo Alto, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 139 days.

(21) Appl. No.: 15/047,402

(22) Filed: Feb. 18, 2016

(65) Prior Publication Data

US 2016/0246970 A1 Aug. 25, 2016

Related U.S. Application Data

(60) Provisional application No. 62/118,394, filed on Feb. 19, 2015.

(51) Int. Cl.
*H04L 29/06* (2006.01)
*G06F 21/60* (2013.01)
*H04N 19/44* (2014.01)
*G06F 21/62* (2013.01)

(52) U.S. Cl.
CPC ........ *G06F 21/602* (2013.01); *G06F 21/6209* (2013.01); *H04N 19/44* (2014.11)

(58) Field of Classification Search
CPC .... G06F 21/602; G06F 21/6209; H04N 19/44
See application file for complete search history.

(56) References Cited

U.S. PATENT DOCUMENTS

| 5,446,273 | A | 8/1995 | Leslie |
| 5,859,920 | A | 1/1999 | Daly et al. |
| 6,044,156 | A | 3/2000 | Honsinger et al. |
| 6,216,228 | B1 | 4/2001 | Chapman et al. |
| 6,754,365 | B1 | 6/2004 | Wen et al. |
| 7,191,156 | B1 | 3/2007 | Seder |
| 2004/0049401 | A1 | 3/2004 | Carr et al. |
| 2004/0258274 | A1* | 12/2004 | Brundage ............... G07D 7/128 382/100 |
| 2005/0077351 | A1* | 4/2005 | De Jong ................. G06K 19/10 235/380 |
| 2005/0169499 | A1* | 8/2005 | Rodriguez ............... G01S 19/14 382/100 |
| 2005/0283830 | A1 | 12/2005 | Guthery et al. |
| 2006/0174134 | A1* | 8/2006 | Taylor .................. G06Q 20/341 713/186 |
| 2007/0024527 | A1* | 2/2007 | Heikkinen ............. G09G 5/373 345/9 |

(Continued)

OTHER PUBLICATIONS

PCT/US2016/018511, "International Search Report and Written Opinion", dated Jun. 13, 2016, 13 pages.

(Continued)

*Primary Examiner* — Sarah Su
(74) *Attorney, Agent, or Firm* — Kilpatrick Townsend & Stockton LLP

(57) ABSTRACT

A method for concealing sensitive information on a portable device via a steganographic image is disclosed. The portable device can be in the form of a card such as a driver's license or credit card and the hidden information may include a person's name or account number.

17 Claims, 8 Drawing Sheets

(56) References Cited

U.S. PATENT DOCUMENTS

| | | | |
|---|---|---|---|
| 2008/0013724 A1* | 1/2008 | Shamoon | H04L 63/0428 380/201 |
| 2008/0148228 A1* | 6/2008 | Dawson | G06F 9/45512 717/115 |
| 2009/0003701 A1 | 1/2009 | Rekhi | |
| 2009/0013186 A1* | 1/2009 | Jeschke | G06F 21/10 713/170 |
| 2009/0200371 A1* | 8/2009 | Kean | G06F 21/31 235/379 |
| 2009/0328175 A1* | 12/2009 | Shuster | G06F 21/36 726/7 |
| 2010/0033305 A1* | 2/2010 | Korgaonkar | H04K 3/28 340/10.1 |
| 2010/0188709 A1* | 7/2010 | Simske | G09C 5/00 358/3.28 |
| 2010/0293376 A1 | 11/2010 | Colon et al. | |
| 2012/0101938 A1* | 4/2012 | Kasower | G06Q 20/12 705/39 |
| 2012/0317018 A1* | 12/2012 | Barnett | G06Q 20/383 705/39 |
| 2013/0077817 A1* | 3/2013 | Naparstek | G06F 21/6209 382/100 |
| 2014/0029809 A1* | 1/2014 | Rhoads | G06K 9/00442 382/112 |
| 2014/0037129 A1* | 2/2014 | Reed | G06T 1/0021 382/100 |
| 2014/0100973 A1* | 4/2014 | Brown | G06Q 20/34 705/17 |
| 2014/0244494 A1 | 8/2014 | Davis et al. | |
| 2014/0294175 A1* | 10/2014 | Boloker | H04L 9/28 380/30 |
| 2014/0297530 A1* | 10/2014 | Eckel | G06Q 20/4014 705/44 |
| 2015/0004934 A1* | 1/2015 | Qian | H04W 8/22 455/411 |
| 2015/0006390 A1* | 1/2015 | Aissi | G06Q 20/40 705/44 |
| 2015/0227922 A1* | 8/2015 | Filler | G06Q 20/367 705/41 |
| 2016/0226585 A1* | 8/2016 | Sibecas | H04B 10/116 |
| 2016/0255078 A1* | 9/2016 | Zhang | H04L 63/18 726/4 |
| 2016/0335746 A1* | 11/2016 | Loke | G06F 3/0488 |
| 2017/0272909 A1* | 9/2017 | Chicoine | H04W 4/023 |

OTHER PUBLICATIONS

EP16753076.5, "Extended European Search Report", dated Jun. 15, 2018, 6 pages.

* cited by examiner

STEGANOGRAPHIC IMAGE ON PORTABLE DEVICE

CROSS REFERENCE TO RELATED APPLICATIONS

This application is a non-provisional application of and claims the benefit of the filing date of U.S. Provisional Application No. 62/118,394, filed on Feb. 19, 2015, which is herein incorporated by reference in its entirety for all purposes.

BACKGROUND

Drivers licenses and payment cards can contain sensitive information such as account numbers, names, addresses, social security numbers, etc. This creates security issues, since people can view this information or take pictures of it.

Embodiments of the invention address these and other problems individually and collectively.

SUMMARY

Embodiments of the invention are directed to systems and methods for protecting data on portable devices (e.g., cards) that can contain sensitive information.

One embodiment of the invention is directed to a system. The system comprises a portable device including a steganographic image. The steganographic image includes a decoy image and hidden information. The portable device also includes a memory storing data representing the hidden information. The system further comprises a mobile device associated with the portable device. The mobile device can reveal the hidden information on the steganographic image.

Another embodiment of the invention is directed to a portable device. The portable device comprises a substrate and a steganographic image on the substrate. The steganographic image includes a decoy image and hidden information. The hidden information is configured to be revealed by a mobile device that is associated with the portable device. The portable device further comprises a memory storing data representing the hidden information.

Another embodiment of the invention is directed to a method comprising moving a mobile device proximal to a portable device. The portable device includes a steganographic image with hidden information, as well as a memory storing data representing the hidden information. The method further comprises displaying the hidden information from the steganographic image.

Another embodiment of the invention is directed to a mobile device configured to perform the above-described method.

Further details regarding embodiments of the invention can be found in the Detailed Description and the Figures.

DETAILED DESCRIPTION

Figure 1:
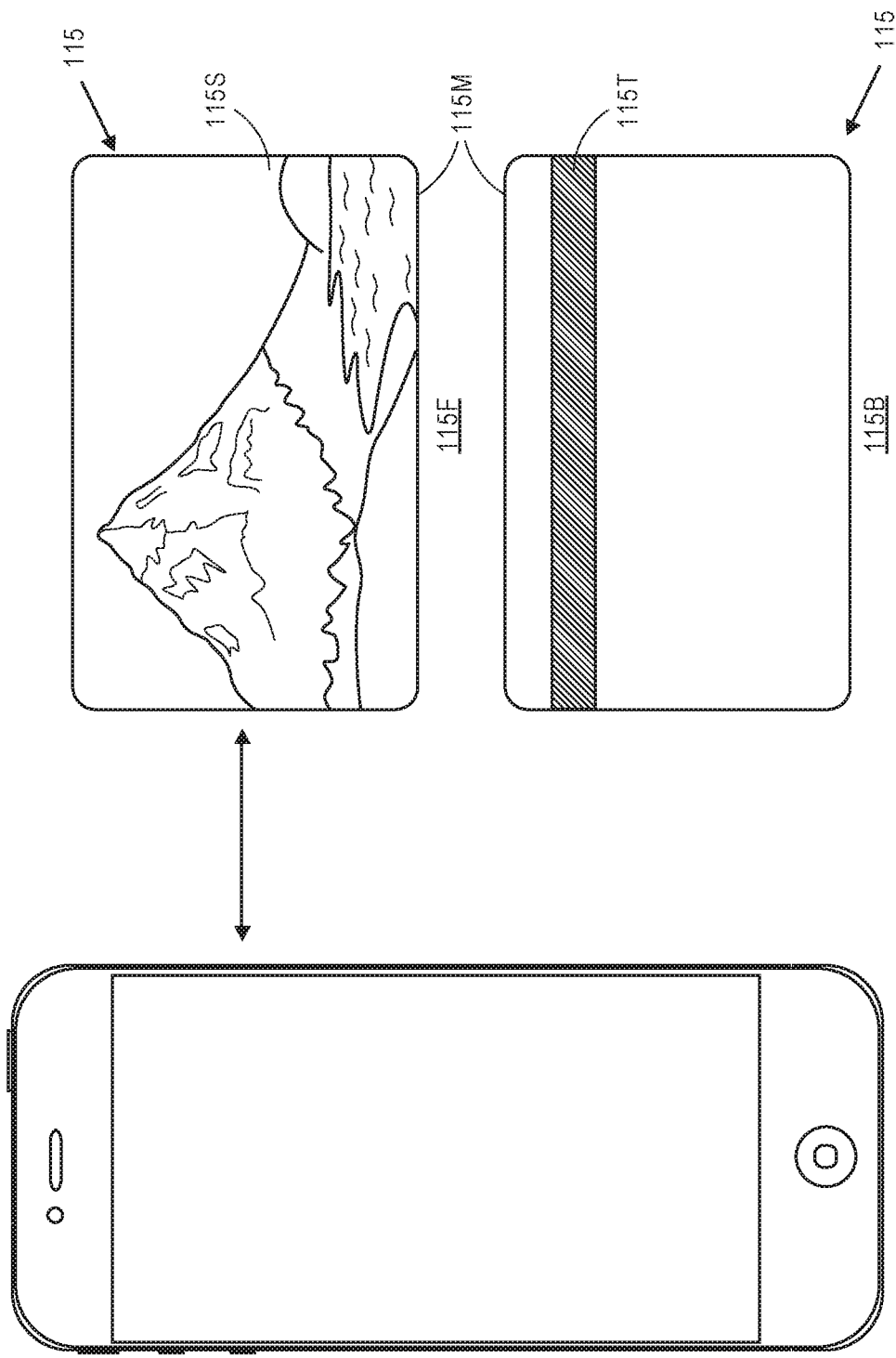
FIG. 1 shows a block diagram of a system according to an embodiment of the invention.

Embodiments of the present invention are directed to protecting sensitive information on a portable device by concealing the sensitive information in a steganographic image. Using embodiments of the invention, bystanders, service people (e.g., waiters, bartenders, access device attendants), etc. are not be able to read or steal the sensitive information on the portable device.

Embodiments allow a user associated with the portable device to retrieve the sensitive information when desired. For example, the user may also possess a mobile device that can reveal the sensitive information from the mobile device.

In some embodiments, a mobile device can be paired with the portable device, such that only one or a select few mobile devices can decode the steganographic image on the portable device. The mobile device may be uniquely manufactured to reveal the hidden information from a specific steganographic image, or the mobile device may include a unique algorithm and/or key for decoding a specific steganographic image.

In some embodiments, the portable device may also include a memory element which can store data representing the hidden information. Accordingly, the user may be able to use the portable device for in-person transactions.

Many consumers primarily use portable devices for in-person transactions, where a card is physically swiped or tapped at an access device. Typically, swiping or tapping a portable device is sufficient for in-person transactions, and visually displayed information on the portable device is not used. Accordingly, concealing any visually displayed portable device information (e.g., in a steganographic image) does not affect the user's experience or cause any inconvenience during in-person transactions.

Prior to discussing specific embodiments of the invention, some terms may be described in detail.

A "user account" may include a record associated with an individual or organization at an account provider. Examples of a user account include a payment account, an access account, a secure data account, a membership account, a mobile network account, an identity account, or any other suitable type of account. A user account may be associated with one or more portable devices.

A "payment account" may include a user account that is usable for making payments. Examples of a payment account include a credit card account, a bank account such as a checking account or savings account, a prepaid account, or any other suitable account associated with payments. In some embodiments, a payment account may be associated with one or more portable devices. A payment account may be identifiable based on payment account information, such as payment credentials.

"Sensitive data" may include information that may cause damage if exposed or stolen. Examples of sensitive data include payment credentials, access codes, login information, passwords, identity information (e.g., a name, address, phone number, social security number, etc.), and/or any other suitable personal, private, or protected information.

"Payment credentials" may include any suitable information associated with an account (e.g., a payment account and/or portable device associated with the account). Such information may be directly related to the account or may be derived from information related to the account. Examples of payment credentials may include a PAN (primary account number or "account number"), user name, expiration date, and verification values such as CVV (card verification value), dCVV (dynamic card verification value), CVV2 (card verification value 2), CVC3 card verification values, etc.

An "access account" may include a type of user account that is usable for obtaining access to a restricted area or restricted information.

A "substrate" may include a layer of material. The layer may comprise plastic, metal, or other material on which information can be stored. In some embodiments, a substrate can be implemented as a portable device.

A "portable device" may include any suitable device that can be transported by a user. In some embodiments, a portable device can contain information associated with a user. For example a portable device can include personal information, payment account information, access account information, a driver's license number, or any other suitable information. Information can be included on a portable device as an image or etching, as data stored on a memory (e.g., a magnetic stripe or integrated circuit), or in any other suitable manner. Examples of a portable device include a payment device, a driver's license, an access card, an identity badge, etc.

A "payment device" may include any suitable device that may be used to conduct a financial transaction, such as to provide payment credentials to a merchant. The payment device may be a physical object. As examples of physical objects, the payment device may comprise a substrate such as a paper or plastic card, and information that is printed, embossed, encoded, or otherwise included at or near a surface of an object. Suitable payment devices can be hand-held and compact so that they can fit into a user's wallet and/or pocket (e.g., pocket-sized). Example payment devices may include smart cards, magnetic stripe cards, keychain devices (such as the Speedpass™ commercially available from Exxon-Mobil Corp.), etc. Other examples of payment devices include pagers, payment cards, security cards, access cards, smart media, transponders, and the like. If the payment device is in the form of a debit, credit, or smartcard, the payment device may also optionally have features such as magnetic stripes and/or integrated circuits. Such devices can operate in either a contact or contactless mode.

A "steganographic image" may comprise an image that includes hidden information. Examples of a steganographic image include an image that has been scrambled, an image that includes invisible information, an image that includes obscured or disguised information, an image that includes encoded information, and any other suitable image that includes concealed information. In some embodiments, when the steganographic image is viewed by the human eye (e.g., viewed without using tools or manipulation to reveal the hidden information), the viewer may see a "decoy image". The decoy image may be any suitable image that does not reveal the hidden information. In some embodiments, the decoy image may appear to be an inconspicuous normal image and not include any indication that there is concealed data (e.g., it may not be apparent or detectable that the image is a steganographic image). A decoy image can take the form of a generic image (e.g., a logo or landscape), a decorative picture, a white noise image, a scrambled image, a blank or empty image, a user-selected image, or any other suitable image.

A "mobile device" may include any suitable device that is moveable. In some embodiments, a mobile device may be a device for retrieving information. For example, a mobile device may be able to extract hidden data from a steganographic image. In some embodiments, a mobile device can utilize a filter, a decoding algorithm, a mask, or any other suitable tools for extracting information from a steganographic image. Examples of a mobile device include an electronic device (e.g., a mobile phone, or another imaging-capable device), a physical filter (e.g., a plastic, semi-transparent, monochromatic light filter), a physical mask, and any other suitable device for retrieving hidden information.

In some embodiments, a mobile device may be an electronic device which may provide remote communication capabilities to a network. Examples of remote communication capabilities include using a mobile phone (wireless) network, wireless data network (e.g. 3G, 4G or similar networks), Wi-Fi, Wi-Max, or any other communication medium that may provide access to a network such as the Internet or a private network. Examples of such mobile devices include mobile phones (e.g. cellular phones), PDAs, tablet computers, net books, laptop computers, personal music players, hand-held specialized readers, etc. Further examples include wearable devices, such as smart watches, fitness bands, ankle bracelets, etc., as well as automobiles with remote communication capabilities. This type of mobile device may comprise any suitable hardware and software for performing such functions, and may also include multiple devices or components (e.g. when a device has remote access to a network by tethering to another device—i.e. using the other device as a modem—both devices taken together may be considered a single mobile device).

A "mask" may be an image or substance for covering or augmenting some or all of another object or image. In some embodiments, a mask may be usable for extracting hidden information from a steganographic image. For example, a mask may reveal hidden information when overlaid on (e.g., placed in front of) a steganographic image. In some embodiments, a mask may be an image composed of transparent pixels and monochromatic pixels, such that the transparent pixels reveal the hidden information, while the monochromatic pixels mask the distracting information. In other embodiments, a mask may include pixels of various colors and shades, such that when the mask is overlaid on the steganographic image, the pixels of the two images are combined, and the combination reveals the hidden information. In some embodiments, a mask can be a physical object or a virtual object.

A "decoding algorithm" may include a process for decoding a steganographic image. For example, a decoding algorithm may include a set of instructions for retrieving hidden information from within a steganographic image. As explained in detail below, different steganography techniques may be associated with different types of decoding algorithms.

An "application" may be computer code or other data stored on a computer readable medium (e.g. memory element or secure element) that may be executable by a processor to complete a task.

A "decoding application" may include an application for extracting information. A decoding application may include a decoding algorithm. In some embodiments, a decoding application can decode a steganographic image. For example, a decoding application may be programmed to receive a steganographic image, decode the image, and provide the hidden information.

An "encryption key" may include any data value or other information suitable to cryptographically encrypt data. A "decryption key" may include any data value or other information suitable to decrypt encrypted data. In some cases, an encryption key and a decryption key may be the same (i.e., a "symmetric key").

A "user" may include an individual. In some embodiments, a user may be associated with one or more user accounts, portable devices, and/or mobile devices. The user may also be referred to as a cardholder, account holder, or consumer.

An "access device" may be any suitable device that provides access to a remote system. An access device may also be used for communicating with a merchant computer, a transaction processing computer, an authentication computer, an airline computer, or any other suitable system. An access device may generally be located in any suitable location, such as at the location of a merchant or at an airport. An access device may be in any suitable form. Some examples of access devices include POS or point of sale devices (e.g., POS terminals), cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a portable device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a portable device (e.g., a payment device or driver's license). In some embodiments, a cellular phone, tablet, or other dedicated wireless device used as a POS terminal may be referred to as a mobile point of sale or an "mPOS" terminal.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

FIG. 1 shows a system comprising a portable device 115 and a mobile device 120. Two sides of the portable device 115 are shown; the front of the portable device 115 (which will be referred to as portable device front 115F), and the back of the portable device 115 (which will be referred to as portable device back 115B).

The portable device 115 shown in FIG. 1 is in the form of a card. However, embodiments allow for other types of portable devices to be used as well. The portable device 115 shown includes a substrate 115M that can be made of plastic, metal, or any other suitable material. In some embodiments, the substrate 115M may be generally rectangular in shape and may comprise a number of sublayers of material. For example, in some embodiments, the substrate 115M may include two or more layers, which can be opaque, transparent, translucent, semi-opaque sheets. Different layers may contain different types of portions of information (e.g., different portions of a steganographic image may be included on different layers).

The portable device back 115B may include a magnetic stripe 115T. In some embodiments, magnetic stripe 115T may instead be on the portable device front 115F. In some embodiments, the portable device 115 may include, instead of or in addition to the magnetic stripe 115T, a microprocessor and/or memory chips, a contactless element, and/or any other suitable type of memory.

The portable device front 115F may include a steganographic image 115S. The steganographic image 115S may be printed or embossed on the substrate 115M, or otherwise shown on the portable device front 115F. In some embodiments, the steganographic image 115S may include a decoy image that conceals one or more pieces of hidden information. For example, a casual viewer (e.g., a person or device viewing without the assistance of the mobile device 120) may only notice the decoy image, and thus the steganographic image 115S may appear to be a normal image. However, in some embodiments, the mobile device 120 may be able to reveal the hidden information in the steganographic image 115S. For example, the hidden information may be visible when the portable device front 115F is viewed through the mobile device 120.

The type of information hidden in the steganographic image 115S may depend on the specific type of the portable device 115. In some embodiments, the hidden information can include sensitive or personal information, account information, identity information, access information, or any other suitable type of information. The hidden information may be information which a user or issuer may wish to protect.

In some embodiments, there may not be user-readable information shown on the portable device 115, as all of the displayed information may be hidden in the steganographic image 115S. However, in other embodiments, some user-information may be displayed in addition to the steganographic image 115S, while other information (e.g., sensitive information) may be concealed in the steganographic image 115S. For example, an issuer name may be shown plainly in the portable device 115, while a user's name and account number may be concealed in the steganographic image 115S.

In some embodiments, the magnetic stripe 115T may include data that represents some or all of the hidden information in the steganographic image 115S. For example, the magnetic stripe 115T may include a user name, account number, expiration date, etc. which may also be concealed in the steganographic image 115S. In some embodiments, other memory elements in the portable device 115 may also or alternatively include such data.

As mentioned above, the mobile device 120 may be able to reveal the hidden information in the steganographic image 115S. In some embodiments, the mobile device 120 can be any suitable device that can retrieve hidden data from a steganographic image. The type of mobile device 120 may depend on the type of steganographic image. Examples of different steganographic techniques and corresponding types of mobile devices 120 are provided below.

Several techniques for creating and decoding steganographic images may be used herein. For example, in some embodiments, a steganographic image 115S can be formed by surrounding an image of information (e.g., sensitive data to be hidden) with decoy imagery and/or manipulating the information so that it is in plain sight, yet camouflaged within the decoy image. For example, the decoy image might be an image of a cloudy sky, where the cloud shapes and colors vary across the image. The hidden information may be included as a subset of clouds with a certain shape or color pattern (e.g., clouds shaped like alphanumeric characters). Accordingly, the hidden information may be visible but obscured and camouflaged by the surrounding imagery. In another example, a decoy image can be a table of rows and columns containing seemingly random alphanumeric characters (e.g., a table with 30 columns and 10 rows). The hidden information can be a subset of the alphanumeric characters (e.g., 25 characters from within a set of 300 characters).

In this scenario with a camouflage-type steganographic image 115S, the hidden information may be revealed via a mask. For example, a certain mask may be configured to cover the surrounding decoy imagery such that only the hidden data is still visible through the mask, thereby revealing the hidden data. Such a mask may include opaque portions to cover the decoy imagery, and transparent portions to reveal the hidden information. Accordingly, in some embodiments, a mobile device 120 can take the form of a physical mask (e.g., a physical substance that can be placed in front of a portable device 115) or a virtual mask (e.g., a virtual image that can be virtually overlaid onto a virtual steganographic image 115S).

In some embodiments, alternative types of masks can be used. For example, a steganographic image 115S can be formed by splitting an image of information into two images. To create the split images, random pixels throughout the original image can be removed and/or replaced, such that the information is no longer recognizable or readable. The remaining image can be the first split image, and the removed pixels can comprise the second split image. Both of the resulting images may appear as random distributions of color (e.g., they may appear to be white-noise images). In this scenario, the first split image can be used as the steganographic image 115S, and the second split image can be used as the mask. When the mask is overlaid onto the steganographic image 115S, the original image of the information can be recreated. Thus, in addition to revealing hidden information in a steganographic image 115S, the mask itself may provide some of the information.

Embodiments allow for any other suitable type of mask to be used. For example, masks can have different portions that are fully opaque, fully transparent, and/or semi-transparent. Masks can vary in color, shape, and size. In some embodiments, masks can reveal hidden information through covering of decoy imagery, constructive interference, destructive interference, and/or any other suitable manner.

In some embodiments, a steganographic image 115S can be created by combining (e.g., multiplexing) a first image of information with a second decoy image. For example, two images can be multiplexed using optical polarization, shuttering, depth of field alteration, light intensity alteration, light angle alteration, anaglyph filters, etc. With a multiplexed steganographic image 115S, the hidden information can be seen when the steganographic image 115S is viewed through a certain filter (e.g., a demultiplexor). For example, a multiplexed steganographic image 115S can be generated such that the hidden information can be viewed when the steganographic image 115S is viewed through a polarizing filter (that passes light of a particular phase or phase range), a shuttering filter, a depth of field filter, a light intensity filter, spectral frequency filters, a light angle filter, an anaglyph filter, or any other suitable type of filter. Accordingly, in some embodiments, the mobile device 120 can take the form of a physical filter (e.g., a semi-transparent plastic card filter or a set of filtering glasses) or a virtual filter. In some embodiments, three or more images can be multiplexed, such that one decoy image is seen in an ambient setting and two different filters can reveal two different hidden images. Additional information regarding this type of steganographic image can be found in U.S. Publication No. 2011/0122152, which is incorporated herein by reference in its entirety for all purposes.

In some embodiments, a steganographic image 115S can conceal information of a certain color. For example, hidden information may be revealed when the steganographic image 115S is filtered such that only a certain color is shown, or such that one or more specific colors are removed. Accordingly, in some embodiments, the mobile device 120 can take the form of a color filter, such as a physical color filter (e.g., a plastic, semi-transparent, monochromatic light filter) or a virtual color filter. For example, the mobile device 120 can be a red light filter, and when the portable device 115 is viewed through the red light filter, hidden information in the color red may be revealed.

In further embodiments, multiple portions of hidden information can be revealed by different color filters. For example, a red filter may reveal a name, a blue filter may reveal an account number, and a green filter may reveal an expiration date.

In some embodiments, a steganographic image 115S can be used that is decoded using computer processing. Accordingly, the mobile device 120 may take the form of an electronic device that includes a camera, a display, and a decoding application.

In one example, a mobile device 120 may be used to decode a steganographic image 115S that conceals information in the least significant bits of a decoy image. The color of each pixel of an image can be described by a certain number of bits. If certain bits, known as least significant bits (LSBs), are changed, the color change may be so minute that the human eye does not notice it. Accordingly, information can be discreetly hidden in a decoy image by replacing some LSBs with bits of secret information.

In an LSB-type steganographic image 115S, the mobile device 120 may capture an image of the steganographic image 115S and then identify the secret bits in the image file. For example, the mobile device 120 can compare the steganographic image 115S to a known base image to determine which pixels and/or bits have been changed. Alternatively, the mobile device 120 may contain instructions as to which bits in the image file may contain secret data. The mobile device 120 can then assemble the correct bits to obtain the hidden data. Additional information regarding this type of steganography can be found in U.S. Patent Publication No. 2009/0003701, which is incorporated herein by reference in its entirety for all purposes.

A mobile device 120 may take the form of an electronic device for other types of steganographic images as well. For example, in another steganography technique, a secret image is hidden by convolving the secret image with a carrier image (e.g., using a Fourier Transform of the image). In order to decode this type of steganographic image 115S, a mobile device 120 may cross correlate the carrier image with a decoding image. Additional information regarding this type of steganography can be found in U.S. Pat. No. 5,859,920, U.S. Pat. No. 6,044,156, U.S. Pat. No. 6,754,365, and U.S. Publication No. 2004/0060976, which are incorporated herein by reference in their entirety for all purposes.

In some embodiments, both the portable device 115 and the mobile device 120 may be uniquely paired, such that only the mobile device 120 can reveal the hidden information from the steganographic image 115S. As a result, only a user in possession of both the portable device 115 and the mobile device 120 may be able to obtain the hidden information.

For example, if the mobile device 120 is a mask or a filter, it may be a unique mask or filter, and other masks or filters may operate differently (e.g., they may use a different pattern or augment steganographic images in a different manner). If the mobile device 120 is an electronic device with a decoding application, the decoding application may use a unique algorithm.

In some embodiments, each steganographic image 115S may also be unique. For example, each steganographic image 115S may include a unique decoy image.

Figure 2:
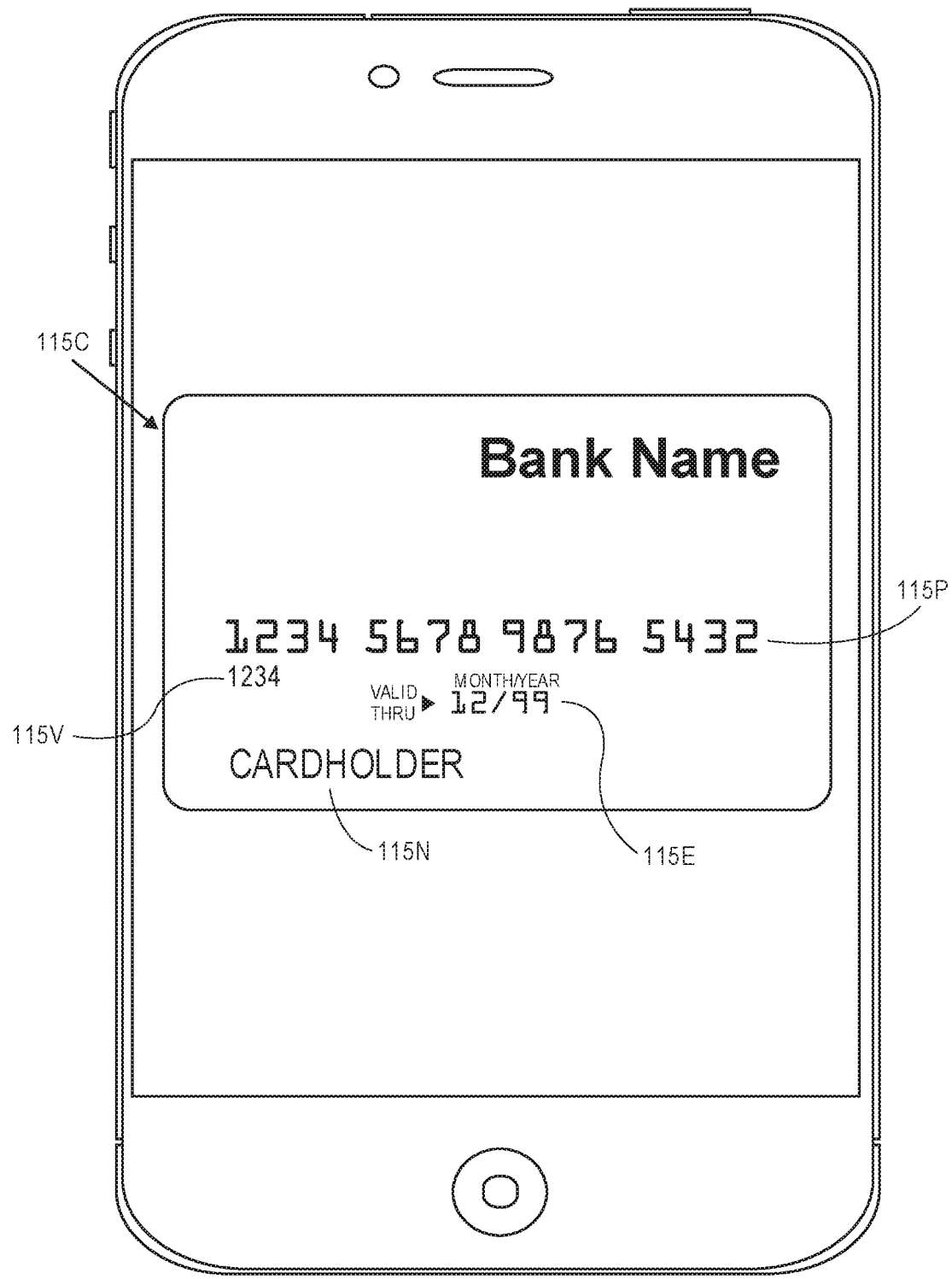
FIG. 2 shows a first example of a mobile device revealing hidden information from a steganographic image on a portable device, according to embodiments of the invention.
Figure 3:
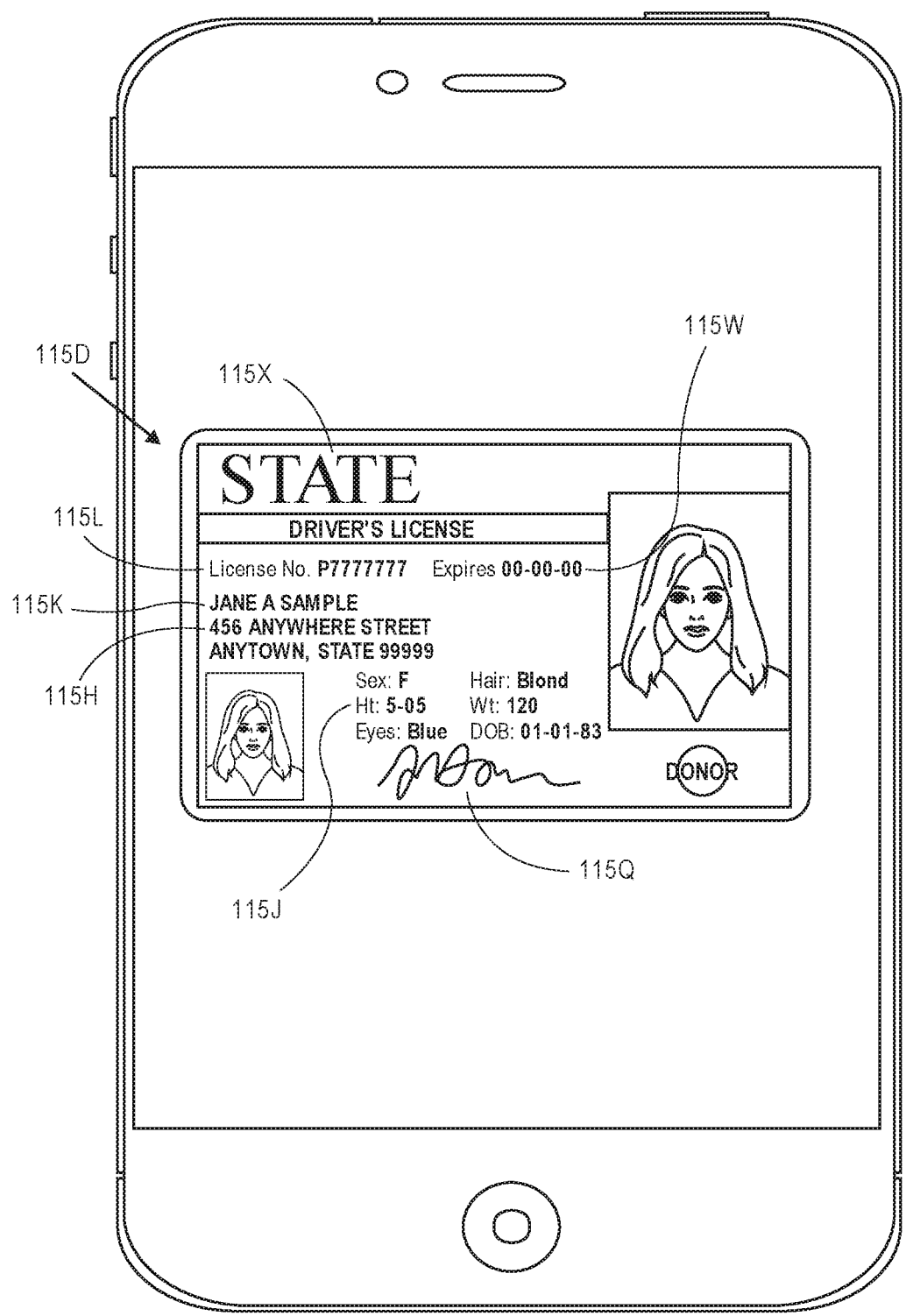
FIG. 3 shows a second example of a mobile device revealing hidden information from a steganographic image on a portable device, according to embodiments of the invention.

Example illustrations of using the mobile device 120 to expose information hidden in the steganographic image 115S are shown in FIGS. 2-3. As mentioned above, the type of information hidden in the steganographic image 115S may depend on the type of portable device 115. Accordingly, two different types of portable devices are shown in FIGS. 2-3. Embodiments also allow for other types of portable devices with any suitable type of hidden information to be utilized.

FIG. 2 shows the hidden information from a steganographic image on a portable device being revealed by a mobile device. The portable device 115C shown in FIG. 2 may be the same as the portable device 115 from FIG. 1. However, instead of viewing the image of the portable device front 115F from FIG. 1, the mobile device 120 may decode the steganographic image 115S or otherwise reveal the image of the portable device 115C. As shown, this decoded portable device 115C can include one or more pieces of information.

As shown in FIG. 2, in some embodiments, the portable device 115C can be a payment device. One or more pieces of payment device data (generically referred to as "user data") may be included on the card, such as a user name 115N, an account number 115P, a CVV 115V, an expiration date 115E, and/or an issuer (e.g., a bank) name. Some or all of this data may comprise payment credentials. As mentioned above, some or all the payment device data may also be stored on a magnetic stripe, an integrated circuit (e.g., a memory chip with a contactless element), or other suitable memory element on the portable device 115C.

Accordingly, a user may be able to use this type of portable device 115C to conduct transactions with a merchant through multiple channels. For example, the portable device 115C may be able to provide the payment credentials to an access device during an in-person transaction via a magnetic stripe or a contactless element. In some embodiments, this type of transaction can take place without decoding the steganographic image. Accordingly, in some embodiments, a user may be able to conduct in-person transactions as usual with the portable device 115C, and onlookers may be unable to view the payment credentials. Additionally, the user may be able to conduct Internet transactions, where the user may enter (e.g., manually type) the payment credentials into a merchant webpage. For this type of transaction, the user may first use the mobile device to obtain the payment credentials from the steganographic image.

FIG. 3 shows another example of hidden information in a steganographic image on a portable device being revealed by a mobile device. In this example, the portable device 115D takes the form of a driver's license or other suitable identity card. One or more pieces of identity data (generically referred to as "user data") may be included on the card, such as a license number 115L, a license expiration date 115W, a driver name 115K, an address 115H, a signature 115Q, a state 115X (e.g., the state where the driver's license was issued), additional driver-identifying information 115J (e.g., the driver's sex, height, eye color, hair color, weight, date of birth, etc.), and any other suitable information. As mentioned above, some or all the identity data may also be stored on a magnetic stripe, an integrated circuit (e.g., a memory chip with a contactless element), or other suitable memory element on the portable device 115D.

Accordingly, a user may be able to use this type of portable device 115D for identity-verifying application via the magnetic stripe (or other memory element) without exposing the data to onlookers. For example, in some embodiments, a user may be able to present (e.g., swipe or tap) the portable device 115D at an airport kiosk in order to obtain a boarding pass associated with the user. The portable device 115D can transmit the identity data, and the kiosk can locate a boarding pass based on the identity data. During this process, bystanders may be able to see the portable device 115D, but they may only be able to see the steganographic image, and not the identity data. In situations where the user wishes to see the identity data, the user may be able to decode the steganographic image with the mobile device. For example, the user may wish to see the identity data when making an online airline reservation (e.g., the airline may request the user's driver's license number or passport number). In another example, a security agent may wish to authenticate the user's identity in person at a security checkpoint. The user may choose to reveal the identity data on the portable device 115D to the security agent via the mobile device. Accordingly, the identity data is protected from potential onlooking fraudsters, but can be revealed when appropriate.

Figure 4:
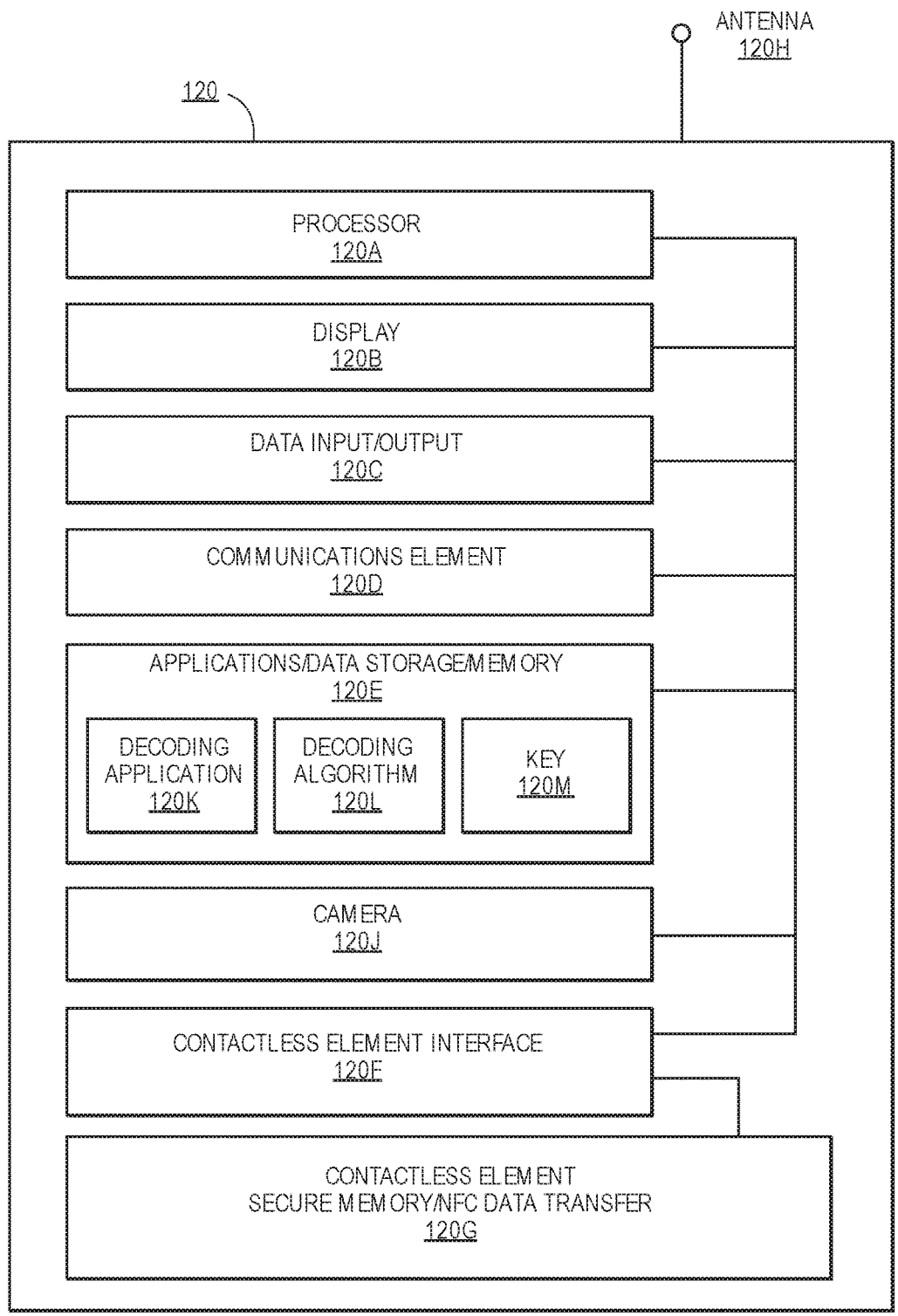
FIG. 4 shows a block diagram of an exemplary mobile device according to an embodiment of the invention.

As mentioned above, the mobile device 120 can take different forms. In some embodiments, the mobile device 120 can take the form of an electronic device which may provide remote communication capabilities to a network. An example of such a mobile device 120, according to some embodiments of the invention, is shown in FIG. 4. The mobile device 120 may include circuitry that is used to enable certain device functions, such as telephony and decoding steganographic images. The functional elements responsible for enabling those functions may include a processor 120A that can execute instructions that implement the functions and operations of the device. Processor 120A may access memory 120E (or another suitable data storage region or element) to retrieve instructions or data used in executing the instructions, such as mobile applications and algorithms. Data input/output elements 120C, such as a keyboard or touchscreen, may be used to enable a user to operate the mobile device 120 and input data (e.g., user authentication data). Data input/output elements may also be configured to output data (via a speaker, for example).

Display 120B may also be used to output data to a user. Communications element 120D may be used to enable data transfer between the mobile device 120 and a wired or wireless network (via antenna 120H, for example) to assist in connectivity to the Internet or other network, and enabling data transfer functions. The mobile device 120 may also include contactless element interface 120F to enable data transfer between contactless element 120G and other elements of the device, where contactless element 120G may include a secure memory and a near field communications data transfer element (or another form of short range communications technology). The mobile device 120 may also include a camera 120J. The camera 120J may be used for capturing images, such as photos of steganographic images on portable devices. As noted, a cellular phone or similar device is an example of a mobile device 120 that may be used in accordance with embodiments of the present invention. However, other forms or types of devices may be used without departing from the underlying concepts of the invention. For example, the mobile device 120 may alternatively be in the form of a key fob, a tablet computer, a wearable device, a vehicle such as a car, etc.

The memory 120E may comprise a decoding application 120K, a decoding algorithm 120L, a key 120M, and any other suitable module or data. The mobile device 120 may have any number of mobile applications installed or stored on the memory 120E and is not limited to that shown in FIG. 3. The memory 120E may also comprise code, executable by the processor 120A for implementing a method comprising activating a decoding application, sending a request for a decoding algorithm associated with a portable device, receiving the decoding algorithm associated with the portable device, imaging the portable device, the portable device including a steganographic image, decoding the steganographic image on the portable device to obtain hidden data, and displaying the hidden data.

The decoding application 120K may be programmed to decode a steganographic image 117 in order to obtain hidden information. For example, the decoding application 120K may include instructions for the processor 120A to receive an image of a steganographic image (e.g., captured with the camera 120J), manipulate the steganographic image based on the decoding algorithm 120L and/or key 120M to extract hidden information, and display or otherwise provide the extracted hidden information. The decoding application 120K may be programmed to decode any suitable type of steganographic image. For example, the decoding application 120K may be configured to apply a virtual mask, a virtual filter, or a decoding algorithm 120L to an image.

As mentioned, the decoding application 120K may include a decoding algorithm 120L and/or any other suitable type of decoding tools (e.g., a virtual mask or virtual filter). In some embodiments, the decoding algorithm 120L may be a unique algorithm, and the decoding algorithm 120L may be paired with a specific steganographic image and/or portable device. For example, the decoding algorithm 120L may be generated along with a steganographic image (e.g., at the portable device manufacturer).

In some embodiments, a user may request the decoding algorithm 120L via the decoding application 120K (e.g., a shell application). In order to identify the correct decoding algorithm 120L, the user may enter a copy of the hidden information (e.g., payment credentials, identity data, etc.) into the decoding application 120K, and the decoding application 120K application may send a request for the decoding algorithm 120L to an algorithm providing computer (which may be associated with the entity that generated the portable device, or any other suitable entity). The request may include the copy of the hidden information. In some embodiments, a copy of the hidden information may have been provided to the user when the user initially received the portable device.

In some embodiments, in addition to being hidden in a steganographic image, the hidden data may also be encrypted. Accordingly, the decoding application 120K may also use a key 120M for decrypting the hidden information once it is extracted from the steganographic image. In some embodiments, the key 120M may be a unique key associated with the portable device and/or steganographic image.

Figure 5A:
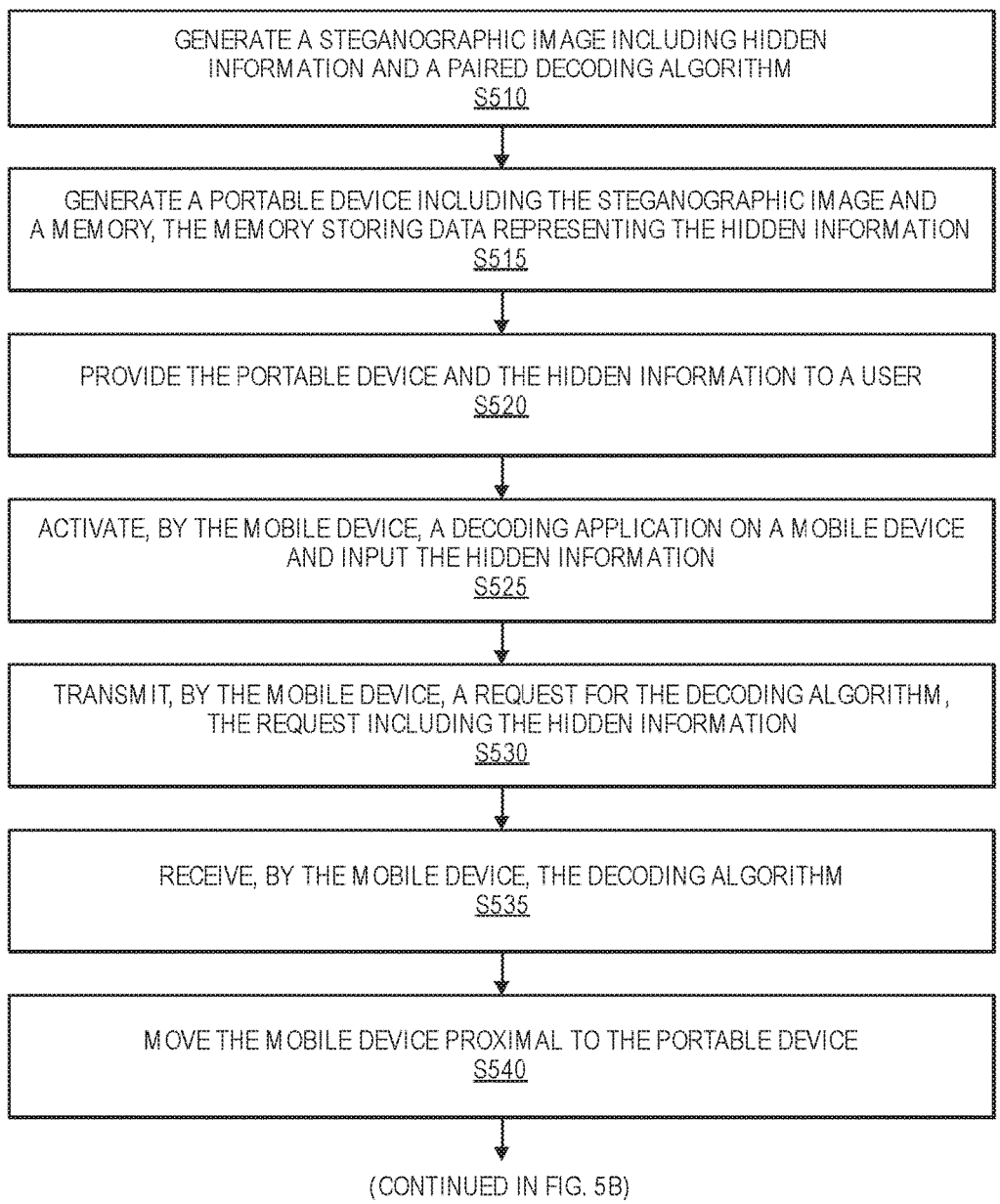
FIGS. 5A-5B show a flow diagram illustrating a method for providing and utilizing a portable device with a steganographic image, according to embodiments of the invention.
Figure 5B:
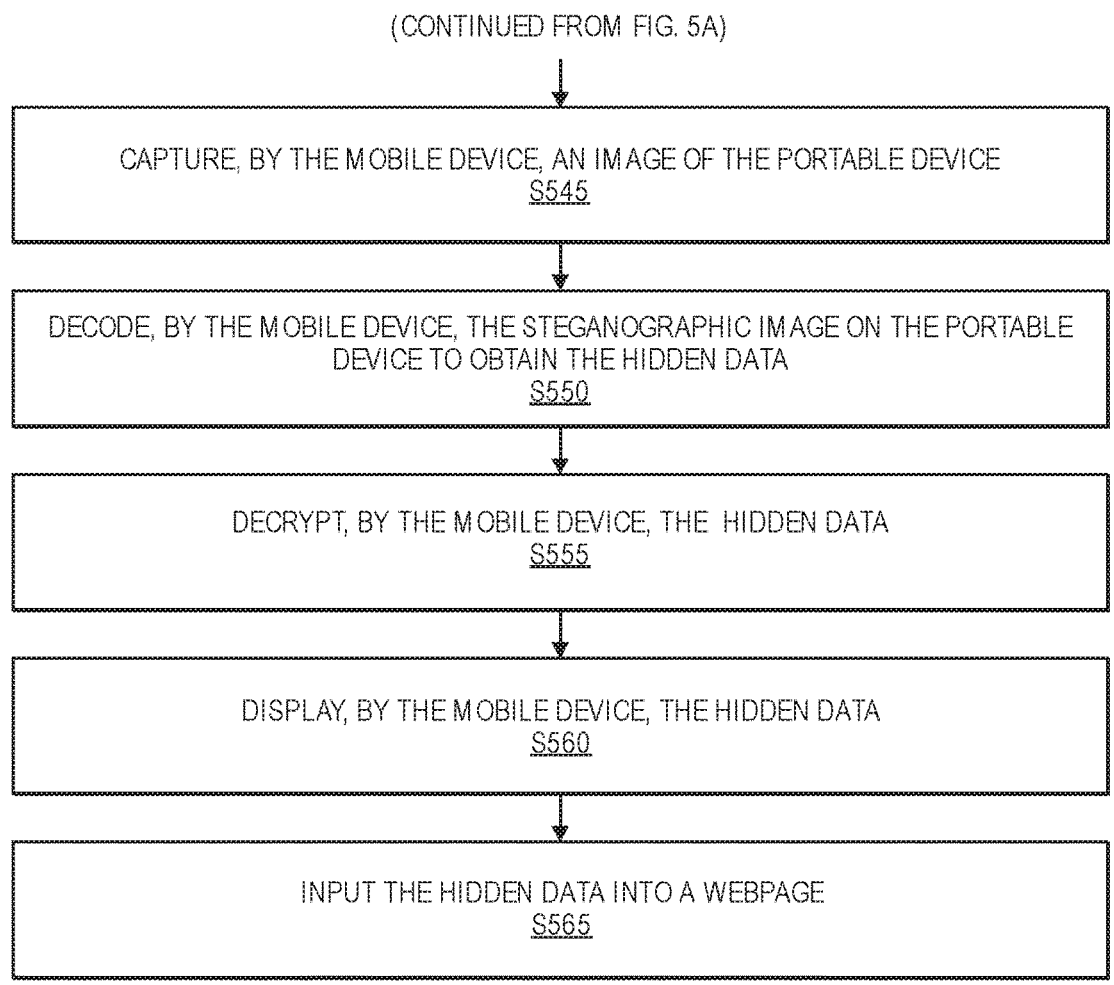

A method 500 according to embodiments of the invention can be described with respect to FIGS. 5A-5B. Some elements in other Figures are also referred to. The steps shown in the method 500 may be performed sequentially or in any suitable order in embodiments of the invention. In some embodiments, one or more of the steps may be optional.

At step S510, a steganographic image including hidden information may be generated. The hidden information may include payment credentials, identity data, other personal or sensitive information, or any other suitable information. A decoding algorithm or mobile device may also be generated and may be configured to reveal the hidden information from the steganographic image.

In some embodiments, the steganographic image and the decoding algorithm (and/or mobile device) may be uniquely paired, such that the steganographic image can only be decoded by that specific decoding algorithm and/or mobile device. For example, in some embodiments, no other steganographic images may be created with the same algorithm for concealing the hidden data.

In some embodiments, the steganographic image (and paired decoding application or mobile device) may be generated by a portable device manufacturer, an account issuer, or any other suitable entity. In any case, the steganographic image may be provided to the portable device manufacturer such that the steganographic image can be imprinted on a portable device.

At step S515, a portable device manufacturer may generate a portable device with the steganographic image. The portable device may also include a memory element, such as a magnetic stripe or an integrated circuit. The memory may store data that represents the hidden information. For example, the memory may include a computer-readable version of the hidden information (e.g., account information, identity information, etc.).

At step S520, the portable device may be provided to a user. The user may be associated with the hidden information. For example, hidden information may include account information, and the user may be associated with the account. The portable device manufacturer, an account issuer, or another suitable entity may send (e.g., mail) the portable device to the user.

In some embodiments, a copy of the hidden information may also be provided to the user. For example, the copy of the hidden information may be printed (e.g., such that it is not hidden and can be read by the user) and provided to the user along with the portable device.

In some embodiments, having received the portable device, the user may be able to use the portable device for in-person transactions. For example, the user may be able to swipe or tap the portable device at an access device in order to transmit the data that represents the hidden information to the access device.

The user may also wish to use the portable device for online transactions, and thus may need to see the hidden information in the steganographic image. In some embodiments, a mobile device (e.g., a physical mask or physical filter) for revealing the hidden information may have been provided at step S520. However, in other embodiments, the portable device may instead be paired with an electronic decoding algorithm that is obtained at a later time. Accordingly, the user may download a decoding application onto an electronic device that can function as a mobile device. The decoding application may be a shell application without a decoding algorithm.

At step S525, the mobile device may activate the decoding application in response to a user indication. The user may input some or all of the hidden information associated with the portable device into the decoding application. For example, the user may read the copy of the hidden information provided at step S520. Alternatively, the user may have received an access code at step S520, and the user may instead input the access code at this point.

At step S530, the mobile device may transmit a request for a decoding algorithm associated with the portable device. The request may be sent to the portable device manufacturer, an account issuer, a third-party decoding algorithm provider, or any other suitable entity that can provide the decoding algorithm. The request may include the copy of the hidden information, such that an appropriate decoding algorithm can be identified for the portable device.

At step S535, the mobile device may receive the decoding algorithm. The decoding algorithm can then be integrated with the decoding application in order to decode the steganographic image on the portable device. In some embodiments, the decoding algorithm may only be provided to one mobile device, such that only one mobile device is capable of decoding the steganographic image.

At step S540, the user may move the mobile device proximal to the portable device. For example, the mobile device may be positioned such that the steganographic image on the portable device is within the field of view of a mobile device camera. The user may also activate the decoding application and/or the mobile device camera such that the steganographic image can be imaged and decoded.

At step S545, the mobile device may capture an image of the portable device. For example, the mobile device camera may take a still photo of the steganographic image on the portable device, or provide a real-time video feed of the portable device.

At step S550, the mobile device may decode the steganographic image based on the captured image. For example, the decoding application may utilize the decoding algorithm to reveal the hidden information in the steganographic image. Accordingly, the mobile device may obtain a copy of the hidden data.

In some embodiments, the hidden data may also be encrypted. Accordingly, at step S555, the mobile device may decrypt the obtained copy of the hidden data. For example, the mobile device may have received a decryption key along with the decoding algorithm at step S535.

At step S560, the mobile device may display the obtained copy of the hidden data to the user. The user may now be able to read whatever information was hidden in the steganographic image (e.g., payment credentials, identity data, etc.).

Having obtained the hidden information, the user may be able to conduct an online (e.g., Internet-based) transaction. Accordingly, at step S565, the user may input the hidden data into a webpage. For example, the user may enter (e.g., manually type) payment credentials into a merchant checkout webpage for a purchase transaction. In another example, the user may enter identity information (e.g., a driver's license number or social security number) into an airline flight reservation webpage.

In some embodiments, the user may use a separate user computer (e.g., a desktop computer) for the Internet transaction. Alternatively, the user may use the mobile device for the Internet transaction. In some embodiments, the mobile device may automatically populate a webpage with the revealed portable device data. For example, after decoding the steganographic image, the mobile device may automatically populate the appropriate fields of a merchant checkout webpage with payment credentials obtained from the steganographic image.

Thus, the hidden information may be protected from public view, yet the user may still be able to view and utilize the hidden information when desired. In some embodiments, the user may be the only entity capable of viewing the hidden information at will, as the mobile device may be uniquely capable of revealing the hidden information, and the user may be in possession of the mobile device.

In some embodiments, the user may primarily use the portable device for in-person transactions, and the portable device may be swiped or tapped as normal for such transactions (e.g., the steganographic image may not need to be decoded). Accordingly, protecting the portable device data in a steganographic image may be an insignificant inconvenience, as the user may rarely need to decode the image.

Figure 6:
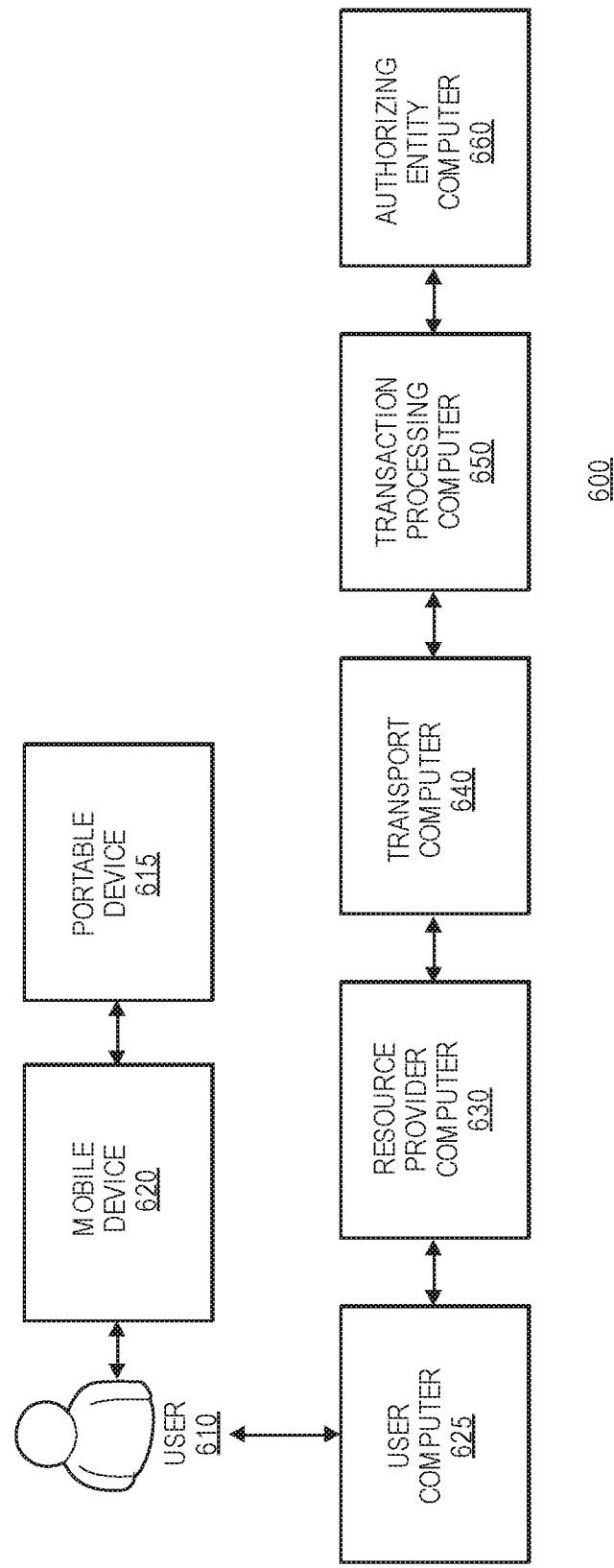
FIG. 6 shows a first example of a system utilizing a portable device with a steganographic image according to an embodiment of the invention.
Figure 7:
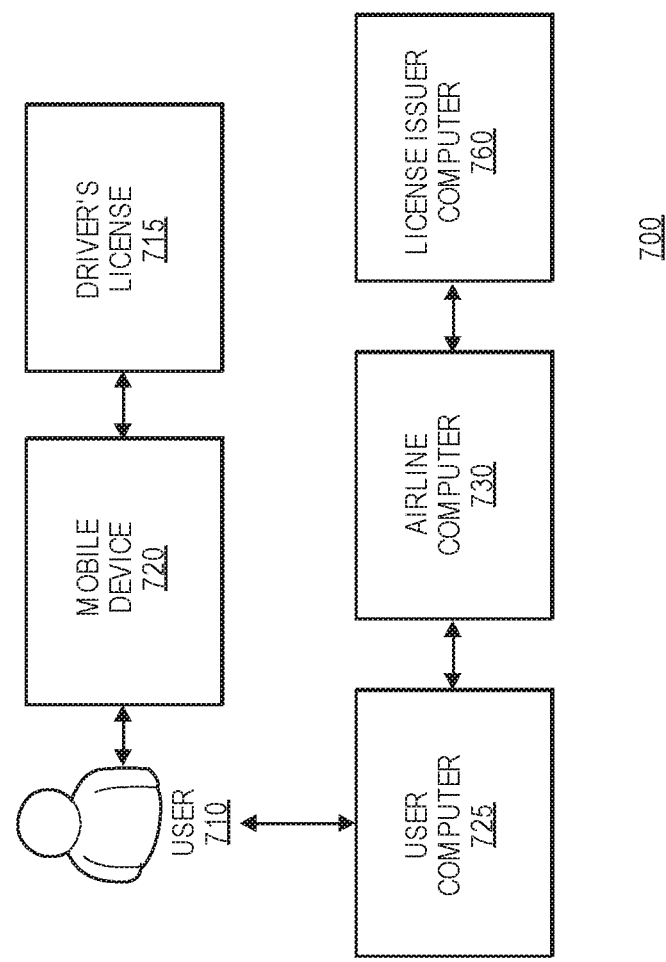
FIG. 7 shows a second example of a system utilizing a portable device with a steganographic image according to an embodiment of the invention.

FIGS. 6-7 provide two examples of systems in which a portable device with a steganographic image can be utilized, according to embodiments of the invention. FIG. 6 shows a system 600 comprising a number of components. The system 600 may be a financial system, and the portable device 615 can be a payment device. The system 600 further comprises a mobile device 620 and a user computer 625 operated by a user 610. The system 600 also comprises a resource provider computer 630, a transport computer 640, a transaction processing computer 650, and an authorizing entity computer 660, each of which may be embodied by one or more computers. The user computer 625 may be in communication the resource provider computer 630. Also, the resource provider computer 630, the transport computer 640, the transaction processing computer 650, and the authorizing entity computer 660 may all be in operative communication with each other through any suitable communication channel or communications network.

The resource provider computer 630 may be associated with a resource provider, which may be an entity that can provide a resource such as goods, services, information, and/or access. Examples of a resource provider includes merchants, access devices, secure data access points, etc. A merchant may typically be an entity that engages in transactions and can sell goods or services, or provide access to goods or services.

The transport computer 640 may be associated with an acquirer, which may typically be a business entity (e.g., a commercial bank) that has a business relationship with a particular merchant or other entity. Some entities can perform both issuer and acquirer functions. Some embodiments may encompass such single entity issuer-acquirers. The transport computer 640 may be more specifically referred to as an acquirer computer.

The transaction processing computer 650 may be disposed between the transport computer 640 and the authorizing entity computer 660. The transaction processing computer 650 may include data processing subsystems, networks, and operations used to support and deliver authorization services, exception file services, and clearing and settlement services. For example, the transaction processing computer 650 may comprise a server coupled to a network interface (e.g., by an external communication interface), and databases of information. The transaction processing computer 650 may be representative of a transaction processing network. An exemplary transaction processing network may include VisaNet™. Transaction processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The transaction processing computer 650 may use any suitable wired or wireless network, including the Internet.

The authorizing entity computer 660 may be associated with an authorizing entity, which may be an entity that authorizes a request. An example of an authorizing entity may be an issuer, which may typically refer to a business entity (e.g., a bank) that maintains an account for a user. An issuer may also issue and manage a payment account associated with the portable device 615.

In some embodiments, the mobile device 620 and/or a decoding algorithm on the mobile device 620 may have been provided to the user by the transaction processing computer 650, authorizing entity computer 660, or any other suitable entity.

The user 610 may be able to use the portable device 615 to conduct transactions with the resource provider associated with the resource provider computer 630. Similar to the portable device in FIG. 1, the portable device 615 may include a steganographic image with hidden data, as well as a memory element with data that represents the hidden data. Similar to the portable device 115C in FIG. 2, the hidden data in the portable device 615 may include payment credentials.

In order to conduct an Internet-based transaction (also referred to as an "online transaction"), the user 610 may, via the user computer 625, select one or more goods or services from a resource provider website (e.g., provided by the resource provider computer 630) and proceed to a checkout webpage. The checkout webpage may request payment credentials for the transaction. Accordingly, the user may then obtain the payment credentials hidden in the steganographic image on the portable device 615. For example, as described above with respect to FIGS. 5A-5B, the user 610 may view the portable device 615 through the mobile device 620, and thereby decode the steganographic image.

Having obtained the payment credentials, the user 610 may provide (e.g., manually enter) the payment credentials to the checkout webpage displayed on the user computer 625. After entering the payment credentials, the user 610 may select a purchase icon or otherwise confirm the transaction.

The payment credentials and transaction data (e.g., information about the items being purchased) may then be sent to the resource provider computer 630. The resource provider computer 630 may then send an authorization request message including the payment credentials and transaction data to the transport computer 640, which may forward the authorization request message to the transaction processing computer 650, which may then forward the authorization request message to the authorizing entity computer 660.

The authorizing entity computer 660 may then authorize the transaction based on the payment account associated with the payment credentials, and then return an authorization response message back to the resource provider computer 630 through the transaction processing computer 650 and the transport computer 640. The resource provider computer 630 may release the purchases goods or services based on the response. A clearing and settlement process can then take place between the transport computer 640, transaction processing computer 650, and the authorizing entity computer 660.

Accordingly, the portable device 615 may take the form of a payment device with payment credentials concealed in a steganographic image. While the payment credentials may not be readily visible, the user 610 may still be able to view and obtain the payment credentials via the mobile device 620, and thus be able to utilize the payment credentials for an Internet transaction via the user computer 625.

In some embodiments, the user 610 may use the mobile device 620 to conduct the online transaction instead of the user computer 625. For example, the mobile device 620 may be an electronic device with Internet commerce functionality. In this example, it may be possible for the mobile device 620 to automatically populate the merchant checkout page with the payment credentials. For example, instead displaying the decoded payment credentials for the user 610 to manually read and enter into the checkout webpage, the mobile device 620 can decode the steganographic image, obtain the payment credentials, and then populate the appropriate fields in the checkout webpage with the payment credentials.

A second example of a system in which a steganographic image can be utilized is given in FIG. 7, according to embodiments of the invention. In FIG. 7, the portable device can be a driver's license 715 (or another identity-authenticating device) used within an identity verification system 700. The system 700 further comprises a mobile device 720 a user computer 725 operated by a user 710. The system 700 also comprises an airline computer 730 and a license issuer computer 760, each of which may be embodied by one or more computers. The user computer 725, the airline computer 730, and the license issuer computer 760 may all be in operative communication with each other through any suitable communication channel or communications network.

The airline computer 730 may be associated with an airline. An airline may typically be an entity that provides air transportation services.

The license issuer computer 760 may be associated with a license issuer. A license issuer may typically be an entity that issues licenses or other identification devices. For example, a license issuer may be a government entity, such as a DMV (department of motor vehicles), that can issue official driver's licenses and/or other identity documents. In some embodiments, the license issuer may be replaced by another identity-verifying entity, such as the department of state, which can issue and verify other types of identity documents (e.g., Passports).

In some embodiments, the mobile device 720 and/or a decoding algorithm on the mobile device 720 may have been provided to the user by the license issuer computer 760 or any other suitable entity.

Similar to the portable device in FIG. 1, the driver's license 715 may include a steganographic image with hidden data, as well as a memory element with data that represents the hidden data. Similar to the portable device 115D in FIG. 3, the hidden data in the driver's license 715 may include identity data (e.g., a driver's license number, a name, an address, a picture, a date of birth, etc.).

The user 710 may be able to use the driver's license 715 to provide identity data to the airline associated with the airline computer 730. For example, in order to make a flight reservation, the user 710 may need to provide identity data to the airline computer 730. The user 710 may not be able to remember all of the identity data (e.g., driver's license number or Passport number), so the user 710 may refer to the driver's license 715 to obtain the identity data. Accordingly, while making a flight reservation (e.g., via the user computer 725), the user may acquire the identity data hidden in the steganographic image on the driver's license 715. For example, as described above with respect to FIGS. 5A-5B, the user 710 may view the driver's license 715 through the mobile device 720, and thereby decode the steganographic image. Having obtained the identity data, the user 710 may provide (e.g., manually enter) the identity data to a flight reservation webpage displayed on the user computer 725.

In some embodiments, the airline computer 730 may then verify that the identity data is authentic. For example the airline computer 730 may send an identity authentication request including the received identity data to the license issuer computer 760. The license issuer computer 760 may be able to lookup identity records and authenticate that the identity information is valid (e.g., the driver's license number exists, and it is associated with the provided name and expiration date). The license issuer computer 760 may send an identity authentication response indicating that the identity is authentic, and the airline computer 730 may then complete the flight reservation.

In some embodiments, even though the identity data is concealed in a steganographic image on the driver's license 715, the user 710 may still be able to use the driver's license 715 for in-person transactions. For example, the user 710 may be able to swipe or tap the driver's license 715 at an airport terminal (or other access device) in order to transmit the identity data (e.g., via a magnetic stripe or contactless chip), such that the airport terminal can identify a flight reservation based on the identity data and print a boarding pass for the user 710.

Additionally, in some embodiments, the user 710 may need to show the identity data to another person, such as a security agent at an airport, a police officer, or a bartender. In this situation, the user 710 may allow the other person to view the driver's license 715 through the mobile device 720.

In FIGS. 5-7, suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

Additionally, in FIGS. 5-7, messages between the computers, networks, and devices may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like. In some embodiments, a request or response may be in an electronic message format, such as an e-mail, a short messaging service (SMS) message, a multimedia messaging service (MMS) message, a hypertext transfer protocol (HTTP) request message, a transmission control protocol (TCP) packet, a web form submission. The request or response may be directed to any suitable location, such as an e-mail address, a telephone number, an Internet protocol (IP) address, or a uniform resource locator (URL). In some embodiments, a request or response may comprise a mix of different message types, such as both email and SMS messages.

Embodiments of the invention have a number of advantages. For example, in embodiments of the invention, sensitive or personal information on a portable device, such as payment credentials on a payment device or identity data on an identity card, may be concealed in a steganographic image. Thus, service people (e.g., waiters), bystanders, and other potential fraudsters will not be able to view the sensitive information. Fraudsters may be tricked into thinking that the steganographic image is just a plain image, and thus they may be unaware that the sensitive information is present but hidden. Also, the sensitive information may be secure in the steganographic image, as a paired mobile device may be uniquely able to decode the image (e.g. due to a unique mobile device, or uniquely provisioned algorithms and/or keys).

Further, steganography has historically been used to communicate information to another person. However, in this case, a user communicates sensitive information to himself. In other words, the user's sensitive information is hidden in a steganographic image, and the user can decode the image when needed. This creates an extra step for the user when conducting transactions over the Internet, as the user may need to decode the steganographic image with a mobile device instead of just reading the sensitive information from the portable device as usual. Accordingly, this may appear to be adding an unnecessary burden to users. However, users do not frequently conduct online transactions or otherwise read displayed sensitive information from a portable device, so concealing the sensitive information does not actually cause a substantial inconvenience for users. Consequently, concealing the sensitive information primarily results in the benefit of eliminating a security risk (e.g., the risk of sensitive data being stolen by an onlooker).

Embodiments allow users to continue to conduct in-person transactions as they did before, so the main mode of transaction may be unaffected by concealing sensitive information in a steganographic image. For example, in addition to concealing sensitive information in a steganographic image, the data representing the sensitive information may also be stored in a computer-readable medium (e.g., a magnetic stripe or contactless chip). Thus, without having to decode the steganographic image, the portable device may be able to transmit the sensitive information to another device (e.g., an access device) during an in-person transaction.

A computer system will now be described that may be used to implement any of the entities or components described herein. Subsystems in the computer system are interconnected via a system bus. Additional subsystems include a printer, a keyboard, a fixed disk, and a monitor which can be coupled to a display adapter. Peripherals and input/output (I/O) devices, which can couple to an I/O controller, can be connected to the computer system by any number of means known in the art, such as a serial port. For example, a serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer-readable medium.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A system comprising:
   a portable device including:
     a substrate,
     a steganographic image on the substrate, the steganographic image including a decoy image and hidden information comprising a payment account number, the payment account number not being in user-readable form anywhere on the substrate, and
     a memory on the substrate, the memory storing the payment account number; and
   a mobile device in the form of a mobile phone associated with the portable device, the mobile device comprising:
     a processor, and
     a non-transitory computer readable medium coupled to the processor, the non-transitory computer readable medium including code executable by the processor for implementing a method comprising:
       receiving, from a user, a copy of the hidden information;
       transmitting, to a server computer, a request for a decoding algorithm, the request including the copy of the hidden information, wherein the server computer identifies, based on the copy of the hidden information, a decoding algorithm that can reveal the hidden information in the steganographic image, wherein the hidden information in the steganographic image can be revealed only by the decoding algorithm;
       receiving the decoding algorithm from the server computer, wherein the server computer only provides the decoding algorithm to one device;
       storing the decoding algorithm;
       imaging the steganographic image on the portable device; and
       displaying the hidden information from the steganographic image.

2. The system of claim 1, wherein the hidden information further includes user identity information.

3. The system of claim 1, wherein the memory is a magnetic stripe or an integrated circuit.

4. The system of claim 1, wherein the decoy image is visible without assistance to a human eye.

5. The system of claim 1, wherein the portable device is in the form of a card.

6. The system of claim 1, wherein the portable device is a payment card.

7. The system of claim 1, wherein the hidden information is encrypted, and wherein the mobile device includes a key that is configured to decrypt the hidden information.

8. The system of claim 1, wherein the decoy image includes an image of a landscape.

9. The system of claim 1, wherein the decoy image is a unique image that is not included on any other portable devices.

10. The system of claim 1, wherein the decoy image does not include any information that is personal or sensitive.

11. A method comprising:
    receiving, at a mobile device in the form of a mobile phone, from a user in possession of a portable device including a steganographic image with hidden information comprising a payment account number, a copy of the hidden information;
    transmitting, by the mobile device, to a server computer, a request for a decoding algorithm, the request including the copy of the hidden information, wherein the server computer identifies, based on the copy of the hidden information, a decoding algorithm that can reveal the hidden information in the steganographic image, wherein the hidden information in the steganographic image can be revealed only by the decoding algorithm;
    receiving, by the mobile device, the decoding algorithm from the server computer, wherein the server computer only provides the decoding algorithm to one device;
    storing, by the mobile device, the decoding algorithm;
    imaging, by the mobile device, the steganographic image on the portable device, the payment account number not being in user-readable form anywhere on the portable device, the portable device further including a memory storing the payment account number; and
    displaying, by the mobile device, the hidden information from the steganographic image.

12. The method of claim 11, further comprising:
    decoding, by the mobile device, the steganographic image to obtain the hidden information comprising the payment account number.

13. The method of claim 11, wherein the hidden information is encrypted, and the method further comprises:
    decrypting, by the mobile device, the hidden information.

14. The method of claim 11, further comprising:
    after displaying, entering the payment account number into a merchant webpage displayed by a user computer in a first transaction that is an Internet transaction; and
    interacting the portable device with a point of sale terminal in a second transaction.

15. A mobile device comprising:

a processor, and a non-transitory computer readable medium coupled to the processor, the non-transitory computer readable medium including code executable by the processor for implementing a method comprising:

receiving, from a user in possession of a portable device including a steganographic image with hidden information comprising a payment account number, a copy of the hidden information;

transmitting, to a server computer, a request for a decoding algorithm, the request including the copy of the hidden information, wherein the server computer identifies, based on the copy of the hidden information, a decoding algorithm that can reveal the hidden information in the steganographic image, wherein the hidden information in the steganographic image can be revealed only by the decoding algorithm;

receiving the decoding algorithm from the server computer, wherein the server computer only provides the decoding algorithm to one device;

storing the decoding algorithm;

imaging the steganographic image on the portable device, the payment account number not being in user-readable form anywhere on the portable device, the portable device further including a memory storing the payment account number; and displaying the hidden information from the steganographic image.

16. The mobile device of claim 15, wherein the method further comprises:

decoding, by the mobile device, the steganographic image to obtain the hidden information comprising the payment account number.

17. The mobile device of claim 15, wherein the hidden information is encrypted, and the method further comprises:

decrypting, by the mobile device, the hidden information.

* * * * *